United States Patent Office 2,763,679
Patented Sept. 18, 1956

2,763,679

PRODUCTION OF PENTAERYTHRITOL CHLORIDES

Robert M. Dee, Beverly, Mass., assignor to Heyden Chemical Corporation, New York, N. Y., a corporation of Delaware No Drawing. Application May 7, 1953,
Serial No. 353,680

9 Claims. (Cl. 260—488)

This invention relates to the preparation of pentaerythritol chlorides, and more particularly to the preparation of the pentaerythritol mono, di, and tri chlorides.

Heretofore, pentaerythritol halides had been prepared by a variety of methods. Fecht (Ber. 40, 3888 (1907) prepared the mono-, di-, and trichloro derivatives of pentaerythritol by reacting pentaerythritol with concentrated hydrochloric acid in a sealed tube at a temperature range varying between 120°–180° C. Pentaerythritol tetrachloride was prepared by reacting the trichloride with $PCl_5$. Govaert and Beyaert (Proc. Acad. Sci. Amsterdam 42, 790–7 (1939)) prepared the monochloride of pentaerythritol by reacting 3,3-di(hydroxymethyl) oxacyclobutane with concentrated hydrochloric acid. Mooradian and Cloke (J. Am. Chem. Soc. 67, 942–4 (1945)) adapted the procedure set forth by Darzens (Compt. rend. 152, 1314–17 (1911)) for the preparation of the di-, tri-, and tetra- chlorides of pentaerythritol by treating alcohols with thionyl chlorides in the presence of tertiary amines. A similar procedure was employed by Rapoport (J. Am. Chem. Soc. 68, 341 (1946)) which comprised reacting pentaerythritol together with p-toluene sulfonyl chloride and pyridine to prepare the chlorides of pentaerythritol. This method was also described in U. S. Patent No. 2,441,595.

The various processes for the preparation of the pentaerythritol chlorides set forth above were unsatisfactory and impractical because of the low yields of the monochloride and dichloride compounds. Further, the chloro compounds could not be satisfactorily separated from the reaction mixtures.

It has now been found that a mixture of pentaerythritol and an acetyl substance selected from the group consisting of acetic acid, acetic anhydride, pentaerythritol tetraacetate, and mixtures thereof can be treated with gaseous hydrogen chloride under substantially anhydrous conditions and thereafter the acetate groups can be removed from the resulting acetate-chlorides by alcoholysis with methanol to obtain a mixture of pentaerythritol chlorides which can be readily separated into the mono-, di-, tri-, and tetrachlorides by solvent extraction. The amount of each of the pentaerythritol chlorides present in the resulting mixture is dependent upon the amount of hydrogen chloride reacted with the pentaerythritol-acetyl substance mixture. By means of this process it is possible to obtain yields as high as 98% of the mixed pentaerythritol chlorides from which the monochloride can be isolated in a yield of approximately 90%, or the dichloride in a yield of approximately 60%.

In a more specific embodiment of this invention, a mixture of pentaerythritol and acetic acid at a temperature of about 160° C. is treated with gaseous hydrogen chloride under substantially anhydrous conditions until the desired degree of chlorination is effected. After the acetate groups have been removed by treatment with hydrogen chloride and methanol, the chlorides are separated by extraction with various organic solvents since the pentaerythritol chlorides differ in their solubility in various organic solvents.

The molar ratio of pentaerythritol to either acetic acid, acetic anhydride or pentaerythritol tetraacetate in the reaction mixture can be varied from 1:1 to 1:3 mole without affecting the yield of the chlorides although other ratios may be used. When acetic acid, acetic anhydride or pentaerythritol tetraacetate is omitted, satisfactory chlorination of pentaerythritol can not be effected.

While a temperature range between 155°–165° is the preferred temperature for the chlorination, satisfactory results have been obtained when the reaction temperature was as low as 120° C. and as high as 175° C.

The chlorination can be carried out in the presence of a dehydrating agent such as zinc chloride, calcium chloride, etc. or a solvent which aids in the removal of the chloride from the reaction mixture such as, for example, toluene, xylene, etc. When zinc chloride is used, however, the preferred reaction temperature varies between 120°–130° C. In using toluene or other water insoluble solvent for the pentaerythritol chlorides, the reaction is preferably carried out at the reflux temperature of the mixture.

The separation of the various pentaerythritol chlorides can be effected in any suitable manner and may be easily and conveniently effected by dissolving the chloride mixture in water followed by extracting the tretrachloride and trichloride with chloroform or carbon tetrachloride. The dichloride is removed by the use of diethyl ether. The monochloride remains dissolved in the water and is separated either by evaporation or by some other suitable means. The trichloride is separated from the tetrachloride by vacuum distillation.

Additional advantages and features of this new and highly improved process are set forth in the following examples which disclose the principles of the invention and the improved embodiments of applying those principles. It is understood, however, that these examples are merely illustrative and not limitative in nature, being capable of various modifications except as set forth in this specification or the claims.

*Example I*

A mixture of 2720 grams (20 moles) of pentaerythritol and 1200 grams (20 moles) of glacial acetic acid was heated to 60° C., and the addition of gaseous hydrogen chloride was begun. After 20 minutes, the temperature rose to 112° C. and slow distillation of a mixture of water, hydrochloric acid, and acetic acid from the reactor had started. The reaction mixture was homogeneous at this time. At the end of an additional 30 minutes, the temperature had increased to about 150° C., and about 400 ml. of distillate had been collected. During the next 35 minutes, the temperature rose to 163° C. where it was maintained for an additional 90 minutes. The addition of hydrogen chloride was stopped, and the reaction mixture was cooled. A total of 930 grams (25.5 moles) of hydrogen chloride had been absorbed and 1052 grams of distillate collected.

The crude pentaerythritol chloride-acetate mixture was then dissolved in 1500 ml. of methanol. Slow distillation of the methanol-methyl acetate mixture from the reactor was carried out over a 17 hour period during which time 6.5 liters of methanol was added at a rate approximately equal to that of the distillation. Six and one half liters of distillate was collected. A slow stream of gaseous hydrogen chloride was passed into the reaction mixture during the distillation.

The methanolic solution of pentaerythritol chlorides was cooled and filtered to remove unreacted pentaerythritol (232 grams of pentaerythritol was recovered). Methanol was removed from the filtrate by vacuum distillation. The residue was dissolved in 2700 grams of water. Pentaerythritol tri- and tetrachlorides were extracted from the aqueous solution with carbon tetrachloride. Then the dichloride was extracted by the use of ethyl ether. The monochloride was isolated by evaporating the aqueous solution to dryness. It was then recrystallized from ethyl ether. Approximately 2100 grams (corresponding to a yield of 88%) of pentaerythritol monochloride (M. P. 135-137° C.) was obtained. Approximately 500 grams of pentaerythritol dichloride was isolated from the ethyl ether solution. The tri- and tetrachloride were not isolated.

Example II

By the procedure described in Example I, 61.5 moles (2250 grams) of hydrogen chloride was added to a mixture of 20 moles of pentaerythritol and 20 moles of glacial acetic acid at 160–5° C. During the reaction, 2096 grams of distillate was collected. After hydrolysis using methanol and hydrogen chloride and removal of the solvent, the crude mixture of pentaerythritol chlorides weighed 3400 grams (98% of theoretical yield calculated as pentaerythritol dichloride).

The crude mixture was added to 3600 ml. of carbon tetrachloride. After cooling at a temperature of −5° C. overnight, the precipitated pentaerythritol dichloride was filtered off, washed with carbon tetrachloride and dried. The crude dichloride was then distilled to yield at 158–62° C./12 mm. 2116 grams (61.2% of theory) of relatively pure pentaerythritol dichloride.

Upon removal of the solvent from the carbon tetrachloride extract, 650.5 grams of a crude mixture of pentaerythritol trichloride and pentaerythritol tetrachloride was obtained. Approximately 500 grams (9.75% yield) of pentaerythritol trichloride (B. P., 126–8° C./11 mm.; M. P., 58–63° C.) was isolated by vacuum distillation of the crude mixture.

The pentaerythritol tetrachloride fraction was not purified.

Example III

A mixture of pentaerythritol (136 grams, 1 mole), glacial acetic acid (60 grams, 1 mole), and zinc chloride (136 grams, 1 mole) was heated and reacted with gaseous hydrogen chloride as described in Example I. The reaction temperature was 120–130° C. During the reaction 60 grams (1.64 moles) of HCl was absorbed. From the reaction mixture was isolated approximately 66 grams of pentaerythritol dichloride and 58 grams of pentaerythritol monochloride.

Example IV

To a mixture of 1 mole (136 grams) of pentaerythritol and 2 moles (204 grams) of acetic anhydride was added 1.66 moles (60.5 grams) of gaseous hydrogen chloride as described in Example I. At the end of the reaction, which was carried out at 158–160° C., the crude reaction mixture weighed 269.5 grams and the distillate 131 grams. After treatment with methanol and hydrogen chloride and distillation of the methanol-methyl acetate mixture, the methanolic solution of pentaerythritol chlorides was cooled and filtered to remove unreacted pentaerythritol (26.5 grams [19.5% of the amount used] was recovered). Methanol was distilled from the filtrate, and the residue was dissolved in water. The solution was treated with chloroform, and then ethyl ether, and then evaporated under vacuum to dryness to yield 55.5 grams (corresponding to a yield of 81%) of crude pentaerythritol monochloride. Upon removal of the solvent from the chloroform and ethyl ether extracts, 7.5 grams of pentaerythritol trichloride and 60 grams of pentaerythritol dichloride were obtained.

Example V

A mixture of pentaerythritol tetraacetate (152 grams, 0.5 mole), pentaerythritol (22.6 grams, 0.17 mole), and 50% sodium hydroxide solution (0.1 cc.) was heated with constant agitation at 155–160° C. for 90 minutes. Over a period of 2 hours at the same temperature, 34.4 grams (0.95 mole) of gaseous hydrogen chloride was added, and 41 grams of distillate was collected. Alcoholysis of the mixed pentaerythritol chloride acetates was carried out using methanolic hydrogen chloride. After removal of unreacted pentaerythritol (14 grams) the alcohol was distilled off and the residue dissolved in water. Ethyl ether was used to extract pentaerythritol dichloride from the solution. Upon distillation, 35.5 grams of pentaerythritol dichloride was obtained. Water was removed from the aqueous solution by distillation under vacuum to yield 44 grams (corresponding to a yield of 53.7%) of pentaerythritol monochloride.

The pentaerythritol chlorides are effective in killing many species of insects whether applied externally or internally. The compounds may be sprayed or dusted upon vegetation without any injury thereto. Usually the compound is reduced to an impalpable powder by grinding and then applied to vegetation either in dry form such as a dust or in wet form such as a spray. The finely powdered substance may be incorporated as a component of an oil emulsion spray. The compounds are also useful as intermediates in the preparation of alkyd resins, drying oils, amines, ethers, sulfur compounds, esters, etc.

It is apparent from the foregoing that the invention is capable of various modifications and that therefore it is intended and desired to embrace within the scope of this invention such modifications and changes that are necessary to adapt it to varying conditions and uses as defined by the scope of the appended claims.

I claim:

1. A process for the production of pentaerythritol chlorides which comprises producing pentaerythritol acetate chlorides by reacting under substantially anhydrous conditions and at a temperature varying between 120°–175° C. pentaerythritol, gaseous hydrogen chloride and an acetyl compound selected from the group consisting of acetic acid, acetic anhydride, pentaerythritol tetraacetate and mixtures thereof, and then hydrolyzing the acetate groups of the pentaerythritol acetate chlorides to produce pentaerythritol chlorides.

2. A process for the production of pentaerythritol chlorides which comprises producing pentaerythritol acetate chlorides by reacting under substantially anhydrous conditions and at a temperature varying between 120°–175° C. pentaerythritol, gaseous hydrogen chloride and an acetyl compound selected from the group consisting of acetic acid, acetic anhydride, pentaerythritol tetraacetate and mixtures thereof, the molar ratio of pentaerythritol to acetyl compound varying between 1:1 to 1:3, and then hydrolyzing the acetate groups of the pentaerythritol acetate chlorides to produce pentaerythritol chlorides.

3. A process for the production of pentaerythritol chlorides which comprises producing pentaerythritol acetate chlorides by reacting under substantially anhydrous conditions and at a temperature varying between 120°–175° C. pentaerythritol, gaseous hydrogen chloride and acetic acid, the molar ratio of pentaerythritol to acetic acid varying between 1:1 to 1:3, and then hydrolyzing the acetate groups of the pentaerythritol acetate chlorides to produce pentaerythritol chlorides.

4. A process for the production of pentaerythritol chlorides which comprises producing pentaerythritol acetate chlorides by reacting under substantially anhydrous conditions and at a temperature varying between 120°–175° C. pentaerythritol, gaseous hydrogen chloride and acetic anhydride, the molar ratio of pentaerythritol to acetic anhydride varying between 1:1 to 1:3, and then hydrolyzing the acetate groups of the pentaerythritol acetate chlorides to produce pentaerythritol chlorides.

5. A process for the production of pentaerythritol chlorides which comprises producing pentaerythritol acetate chlorides by reacting under substantially anhydrous conditions and at a temperature varying between 120°–175° C. pentaerythritol, gaseous hydrogen chloride and pentaerythritol tetraacetate, the molar ratio of pentaerythritol to pentaerythritol tetraacetate varying between 1:1 to 1:3, and then hydrolyzing the acetate groups of the pentaerythritol acetate chlorides to produce pentaerythritol chlorides.

6. A process for the production of pentaerythritol chlorides which comprises producing pentaerythritol acetate chlorides by reacting under substantially anhydrous conditions and at a temperature varying between 155°–165° C. pentaerythritol, gaseous hydrogen chloride and an acetyl compound selected from the group consisting of acetic acid, acetic anhydride, pentaerythritol tetraacetate and mixtures thereof, the molar ratio of pentaerythritol to acetyl compound varying between 1:1 to 1:3, and then treating the resulting reaction mixture with methanol and hydrochloric acid to convert the pentaerythritol acetate chlorides to pentaerythritol chlorides.

7. A process for the preparation of pentaerythritol chlorides which comprises producing pentaerythritol acetate chlorides by reacting, in the presence of zinc chloride and under substantially anhydrous conditions pentaerythritol and gaseous hydrogen chloride with a substance selected from the group consisting of acetic acid, acetic anhydride, pentaerythritol tetraacetate and mixtures thereof, the reaction being conducted at a temperature varying between 120°–130° C., and converting the pentaerythritol acetate chlorides by alcoholysis with methanol to pentaerythritol chlorides.

8. A process for the preparation of pentaerythritol chlorides which comprises producing pentaerythritol acetate chlorides by reacting, in the presence of toluene and under substantially anhydrous conditions pentaerythritol, gaseous hydrogen chloride and a substance selected from the group consisting of acetic acid, acetic anhydride, pentaerythritol tetraacetate and mixtures thereof, the reaction being conducted at the reflux temperature of the mixture, and then separating the pentaerythritol chloride products after alcoholysis by means of solvent extraction.

9. The process of producing pentaerythritol acetate chlorides comprising reacting under substantially anhydrous conditions and at a temperature in the range of 120°–175° C. pentaerythritol, gaseous hydrogen chloride and an acetyl compound selected from the group consisting of acetic acid, acetic anhydride and pentaerythritol tetraacetate, the ratio of pentaerythritol and acetyl compound being in the range of 1:1 to 1:3.

References Cited in the file of this patent

UNITED STATES PATENTS

| | | |
|---|---|---|
| 1,509,463 | Backhaus | Sept. 23, 1924 |
| 2,144,612 | Britton et al. | Jan. 24, 1939 |
| 2,441,595 | Rapoport | May 18, 1948 |

OTHER REFERENCES

Fecht; Berichte der Deutschen Chemischen Gesellschaft, vol. 40, pgs. 3888 to 3889 (1907.)